(12) United States Patent
Hsia

(10) Patent No.: US 7,612,821 B1
(45) Date of Patent: Nov. 3, 2009

(54) MODULAR CAMCORDER

(75) Inventor: Chorng-Guang Hsia, Saratoga, CA (US)

(73) Assignee: Team Research, Inc., San Jose, CA (US)

( * ) Notice: Subject to any disclaimer, the term of this patent is extended or adjusted under 35 U.S.C. 154(b) by 293 days.

(21) Appl. No.: 11/773,320

(22) Filed: Jul. 3, 2007

Related U.S. Application Data

(60) Provisional application No. 60/807,801, filed on Jul. 19, 2006.

(51) Int. Cl.
*H04N 5/222* (2006.01)
*H04N 7/18* (2006.01)
*H04N 5/225* (2006.01)

(52) U.S. Cl. .............. 348/333.01; 348/75; 348/333.07; 348/373

(58) Field of Classification Search ............ 348/333.01, 348/75, 333, 373, 333.07
See application file for complete search history.

(56) References Cited

U.S. PATENT DOCUMENTS

| | | | |
|---|---|---|---|
| 4,887,161 A * | 12/1989 | Watanabe et al. ........ | 348/231.7 |
| 5,502,727 A * | 3/1996 | Catanzaro et al. ........... | 370/271 |
| 5,659,361 A * | 8/1997 | Jin .............................. | 348/375 |
| 5,867,218 A * | 2/1999 | Matsuzaki et al. .......... | 348/373 |
| 6,512,670 B1 * | 1/2003 | Boehme et al. ........ | 361/679.29 |
| 6,873,356 B1 * | 3/2005 | Kanbe et al. ............. | 348/207.1 |
| 6,965,394 B2 * | 11/2005 | Gutta et al. .............. | 348/14.05 |
| 7,009,637 B2 * | 3/2006 | Sawachi ................ | 348/211.99 |
| 7,046,286 B1 * | 5/2006 | Kobayashi et al. ..... | 348/333.06 |
| 7,502,220 B2 * | 3/2009 | Shudo et al. ............. | 361/679.3 |

* cited by examiner

*Primary Examiner*—Nhan T Tran
*Assistant Examiner*—Quang V Le
(74) *Attorney, Agent, or Firm*—Roger H. Chu

(57) ABSTRACT

Modular camcorders are described. According to one exemplary embodiment of the present invention, a modular camcorder includes a digital video camera unit ("camera unit") and a portable multimedia player (PMP) modular unit ("PMP unit"). The camera unit includes a camera means for capturing images of an object, and a recording means for recording the captured images and associated audio therewith. The PMP unit comprises a display monitor (e.g., LCD) and a storage device (e.g., hard disk). In the standalone mode, the PMP unit is an apparatus such as a MP3 player. When the PMP unit is coupled to the camera unit via a pair of matching connectors, the combined device becomes the modular camcorder. The pair of matching connectors (e.g., a female/male, or male/female) is designed such that one of them is located on the camera unit and the other on the PMP unit.

7 Claims, 7 Drawing Sheets

120

USB pins 212

Camera unit control pins 214

Power pins 216

Other reserved pins 218

MODULAR CAMCORDER

CROSS REFERENCE TO RELATED APPLICATION

This application claims priority from Provisional Patent Application No. 60/807,801, filed on Jul. 19, 2006, the entire contents of which are incorporated herein by reference.

FIELD OF THE INVENTION

The present invention generally relates to the fields of consumer electronic devices such as portable multimedia players (PMP) and camcorders, more particularly to a modular camcorder that is formed with a PMP and a camera device.

BACKGROUND OF THE INVENTION

Consumer electronic devices such as camcorder have been popular for the consumers. A typical camcorder is shown in FIG. 5, which is a portable electronic apparatus that contains a camera and a recorder for photographing an object and for recording video images of the object and associating audio onto a storage device, respectively. Modern camcorders have become smaller packed with more functions and capabilities. Most desirable features are a larger storage medium such as hard disk, and a larger and better quality LCD monitor. However, there are drawbacks associated with these two components. Both the built-in hard disk and the built-in LCD monitor are very fragile and easy to break down. Further, these components are difficult to replace and service when they are out of order.

Therefore, it would be desirable to have an improved camcorder to have an easy replaceable or exchangeable display monitor and/or storage device.

BRIEF SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses modular camcorders. According to one aspect of the present invention, a modular camcorder includes a digital video (DV) camera unit (hereinafter referred to as "camera unit") and a portable multimedia player (PMP) modular unit (hereinafter referred to as "PMP unit"). The camera unit includes a camera means for capturing optical images of objects, and a recording means for recording the captured images and associated audio therewith. The PMP unit comprises a display monitor (e.g., LCD) and a storage device (e.g., hard disk). In the standalone mode, the PMP unit is an apparatus such as a MP3 player. When the PMP unit is coupled to the camera unit via a pair of matching connectors, the combined device becomes the modular camcorder. The pair of matching connectors (e.g., a female/male, or male/female) is designed in accordance with a modular camcorder connector interface such that one of them is located on the camera unit and the other on the PMP unit.

According to another aspect, types of PMP unit comprise of custom made PMP units as well as third-party PMP units including, but not limit to, Apple iPod®, Creative Labs ZEN, Sony MP3 player, and the like. Each type of the PMP units may be coupled to the camera unit via either a connector directly or an adapter indirectly. Once the PMP unit is coupled to the camera unit, a PMP unit camcorder control application (e.g., firmware installed on the PMP unit) will be activated to detect the camera unit and to take control of the functions of the camera unit. The detection and control may be accomplished with a protocol between the PMP unit and the camera unit. In general, the custom made PMP unit is able to be directly coupled to the camera unit, as the custom made PMP unit and the camera unit are both manufactured in accordance with the modular camcorder connector interface. Third-party PMP units may require using an adapter as a bridge to the camera unit due to different proprietary designs and/or different industry standards.

According to yet another aspect, a modular camcorder connector interface comprises a plurality of pins and receptacles for pins, including Universal Serial Bus (USB), power, camera unit control, and other reserved pins. The adapter is configured to bridge physical and/or logical differences between pins of the third-party PMP unit and pins of the camera unit.

To control the modular camcorder, there may be two camcorder control application modules to be installed: camera unit firmware and PMP unit firmware. According to yet another aspect, the camera unit firmware may be stored in a memory (e.g., flash memory) and executed on a processor (e.g., DSP or microprocessor) of the camera unit. The PMP unit firmware is stored on a memory (e.g., flash memory) and executed on a processor (e.g., DSP or microprocessor) of the PMP unit. The PMP unit firmware is configured to facilitate at least the following functions: i) control display monitor, ii) hard disk drive and iii) modular camcorder controls on the camera unit.

According to one embodiment, the present invention is a camcorder comprises at least the following: a camera unit and an optional camera unit camcorder control application installed thereon; and a portable multimedia player (PMP) unit and a PMP unit camcorder control application installed thereon, wherein said PMP unit is coupled to said camera unit via a first connector in said camera unit and a second connector in said PMP unit.

One of the objects, features, and advantages of the present invention is to not only allow an easier repair, service, replace, exchange to the fragile components and data files of a camcorder, but also reduce the manufacturing cost of such camcorder significantly.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-4. However, those skilled in the art will readily appreciate that the detailed description given herein with respect to these figures is for explanatory purposes as the invention extends beyond these limited embodiments.

Figure 1A:
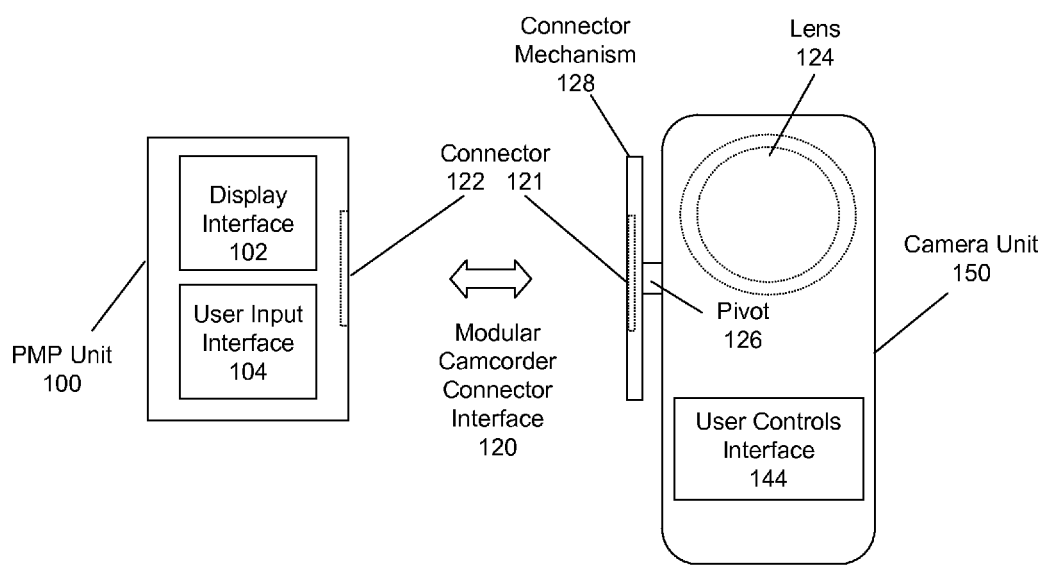
FIG. 1A is diagram showing a first exemplary modular camcorder, according to an embodiment of the present invention.

Referring now to the drawings, FIG. 1A is a diagram showing an exemplary modular camcorder 10, according to an embodiment of the present invention. The modular camcorder 10 comprises a camera unit 150 and a portable multimedia player (PMP) unit 100 coupled to each other via a pair of matching connectors, a first connector 121 and a second connector 122 in accordance with a modular camcorder connector interface 120. The PMP unit 100 is configured to be a self-reliant electronic device capable of storing and playing files in a variety of video and audio formats.

Outside components of the PMP unit 100 including a display interface 102, a user input interface 104 and the second connector 122. The display interface 102 may comprise a LCD configured for displaying a variety of menus of choices or various statuses of the PMP unit 100. The user input interface 104 comprises a scroll wheel or other devices that may be used to let a user to traverse and select a choice from each menu. The second connectors 122 is configured to couple to the first connectors 121 of the camera unit.

Figure 1B:
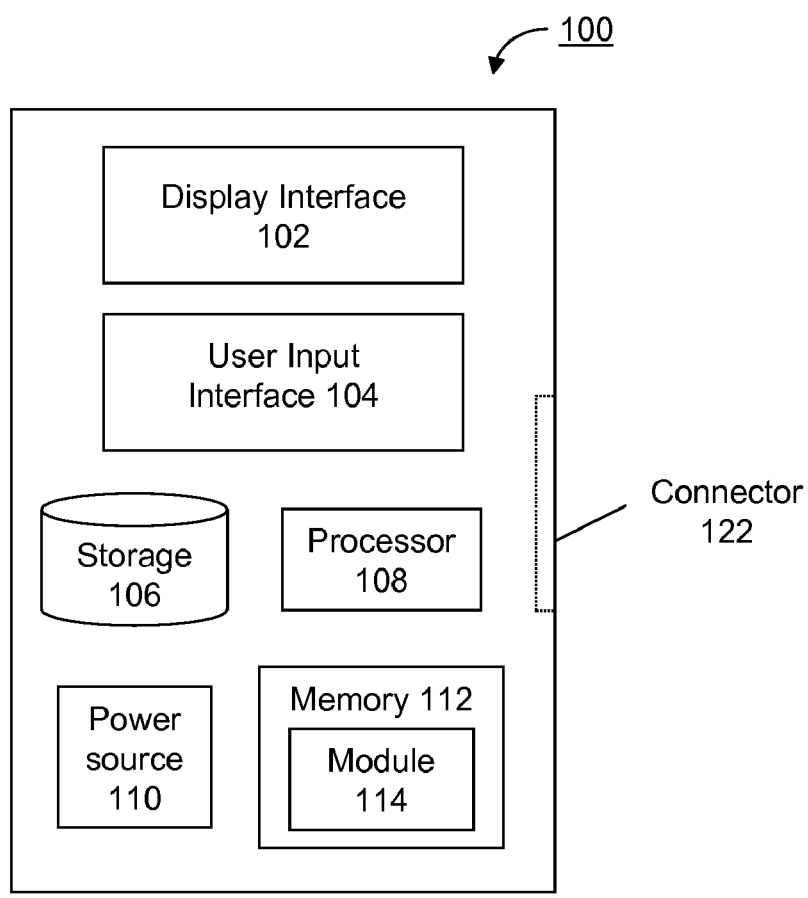
FIG. 1B is a diagram showing an exemplary portable multimedia player (PMP) unit in accordance with one embodiment of the present invention.

FIG. 1B shows a functional diagram of the exemplary PMP unit 100 of FIG. 1A. The PMP unit 100 is a customer made PMP. The PMP unit 100 is configured to play files (e.g., digital contents) in various audio and video formats. In video, the formats include Movie Picture Experts Group (MPEG), DivX, AMV, SigmaTel, etc. In audio, the formats include MP3 (MPEG-1 Audio Layer 3), Waveform (WAV), Ogg Vorbis, etc.

In additional to the display interface 102, the user input interface 104, and the second connector 122, the PMP unit 100 further comprises a processor 108, a storage device 106, a memory 112 and a power source 110. The storage device 106 is configured to store files to be played in the PMP unit 100. The storage device 106 may comprise a hard disk drive or a high capacity flash memory device. The processor 108 is configured to execute the instructions of application modules 114 stored in the memory 112. The processor 108 may comprise a DSP or a general purpose microprocessor. The memory 112 is configured to provide memory to the processor 108. The power source 110 is configured to provide power to the PMP unit 100. The power source 110 may comprise battery (e.g., rechargeable, disposable), power from an AC power outlet converted by a transformer.

The camera unit 150 is configured as a camera capable of capturing optical images as still images (e.g., photographs) or as a sequence of moving images (i.e., movies or videos). Outside components of the camera unit 150 including a lens 124, a user controls interfaces 144, a connector mechanism 128 and the first connector 121. The lens 124 is configured to gather and focus lights reflected from objects (i.e., optical images of the objects) to be captured as still or moving images. The user controls interface 144 is configured to provide controlling functions of the camera unit 150 (e.g., power on/off, shutter, record on/off, focusing, etc.). The user controls interface 144 may comprise a variety of buttons, switches, sliding bars. The connector mechanism 128 is configured to house the first connector 121 and configured to be pivoted about a pivot 126 optionally.

Figure 1C:
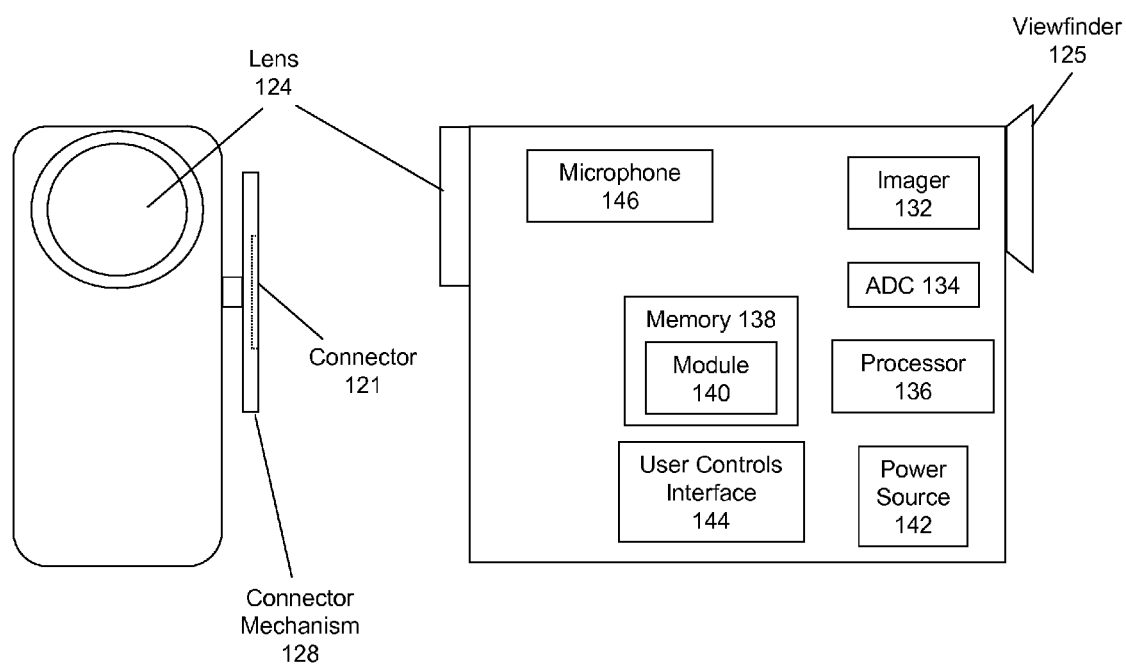
FIG. 1C is a functional diagram showing an exemplary camera unit in accordance with one embodiment of the present invention.

FIG. 1C shows salient components of the exemplary camera unit 150 of FIG. 1A. The camera unit 150 further comprises an imager 132, an analog-to-digital converter (ADC) 134, a processor 136, a memory 138, a power source 142, an optional microphone 146 and a viewfinder 125. The imager 132 is either made of charge-coupled-device (CCD) or complementary metal oxide semiconductor (CMOS) image sensor. The imager 132 converts the lights through the lens 124 into electrical video signals (i.e., analog signals), which is digitized by the ADC 134. The processor 136 (e.g., a digital signal processor (DSP), a general purpose microprocessor) is configured to execute the instructions from application modules 140 installed on the memory 138, which is configured to provide memory space for the processor 136. The power source 142 is configured to provide power to operate the camera unit 150. The power source 142 may be from a battery or from a power through a power outlet with a transformer. The microphone 146 is configured to capture audio signals along with captured optical images. The viewfinder 125 is configured to provide a user to see through the lens 124 to position the camera unit 150 to capture the images of interest. The camera unit 150 may comprise a digital camera or camcorder without a display screen or hard disk storage device.

According to one embodiment of the present invention, a first modular camcorder 10 is formed by coupling the PMP unit 100 and the camera unit 150 with the pair of matching connectors, the first 121 and the second connector 122. When the PMP unit 100 and the camera unit 150 are separated, each device is a standalone electronic device. The first modular camcorder 10 uses the camera unit 150 to capture images and uses the PMP units to provide a display screen (i.e., the display interface 102) and a storage medium (i.e., the storage device 106). In order for the camcorder 10 functioning properly, a first or PMP unit camcorder control application (e.g., firmware or application module 114) needs to be installed on the PMP unit 100, and a second or camera unit camcorder control application (e.g., firmware or application module 140) needs to be installed on the camera unit 150. In some instances, the first and second control applications may be pre-installed, the relevant camcorder control functions or options are activated only when the PMP unit 100 and the camera unit 150 are coupled together.

Figure 2:
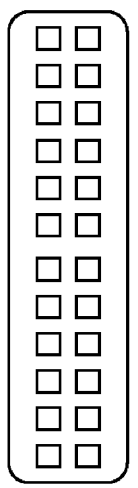
FIG. 2 is a diagram showing an exemplary connector interface of the first exemplary modular camcorder of FIG. 1, according to an embodiment of the present invention.

The first 121 and the second connector 122 correspond to each other in accordance with a modular camcorder connector interface 120. For example, one of the connectors is a male the other female, or vice versa, such that the pair of connectors can be coupled together. FIG. 2 shows a diagram of an exemplary modular camcorder connector interface 120 in accordance with one embodiment of the present invention. The connector interface 120 is used by the pair of matching connectors; each comprises a plurality of pins including Universal Serial Bus (USB) pins 212, camera unit control pins 214, power pins 216, and reserved pins 218 for other relevant functions. The USB pins 212 are configured to transmitting data between the PMP unit 100 and the camera unit 150, for example, the digitized images taken by the camera unit 150 are stored onto the storage device 106 via the USB pins 212. The camera unit control pins 214 are configured to transmit camcorder control signals between the PMP unit 100 and the camera unit 150. Examples of the control signals may include the signal to activate the recording mechanism on the camera unit 150. The power pins 216 are configured to transmit electric power. Finally the other reserved pins 218 are configured for the future expansion (e.g., a new revision of USB or camcorder control signal protocols). The pins described herein may be a male pin or a female receptacle. For example, the USB pins 212 may be male while the power pins 216 may be female on one of the pair of matching connectors. The only restriction is that the corresponding pins on the second one of the matching connectors must be opposite to the first one such that the pins and the receptacles can be coupled together.

Figure 3:
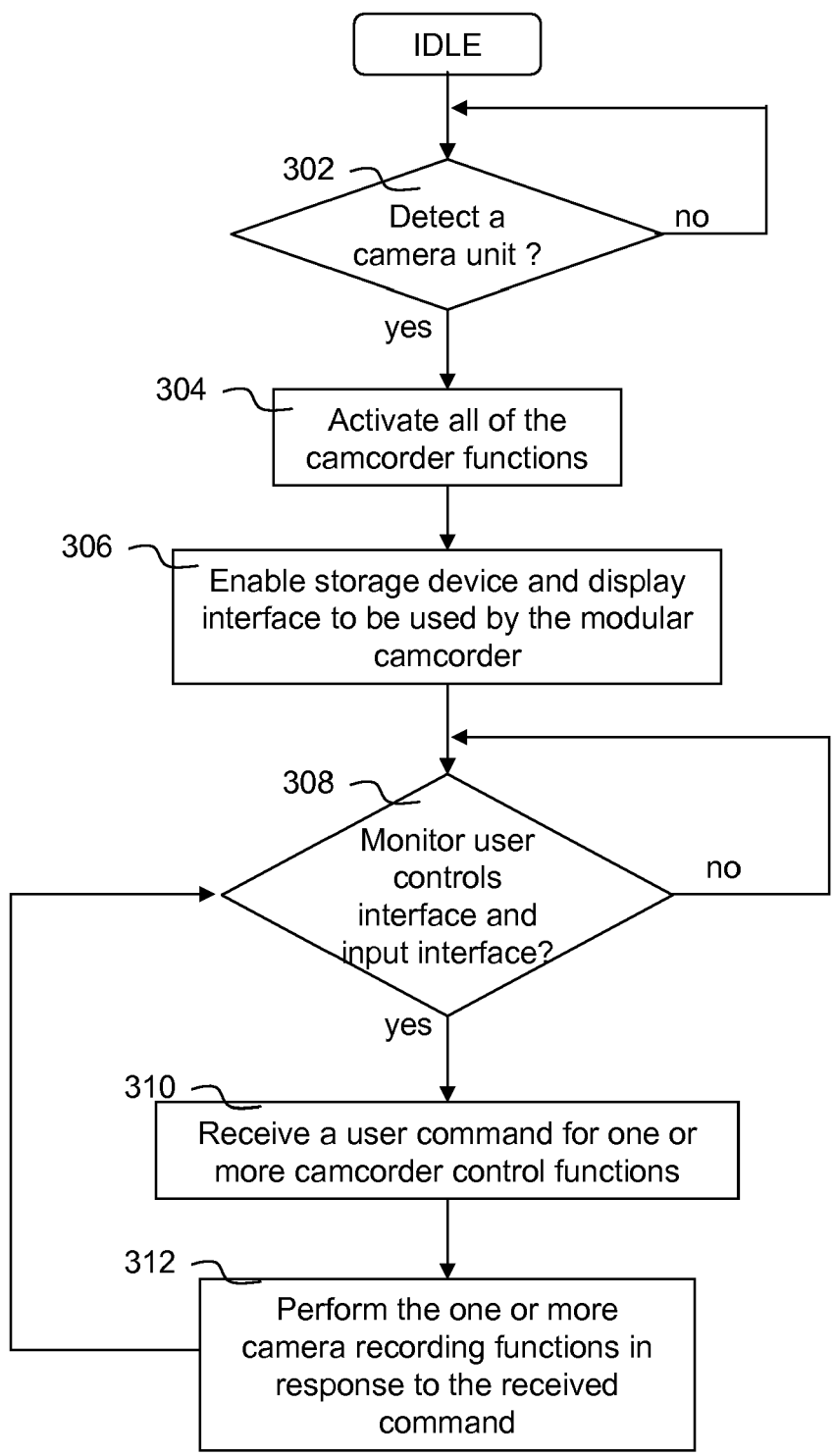
FIG. 3 is a flowchart illustrating a process of controlling of the first modular camcorder of FIG. 1A in a PMP unit camcorder control application installed on the PMP unit of FIG. 1B, according to an embodiment of the present invention.

Referring to FIG. 3, which is a flowchart illustrating a process 30 of controlling of the first modular camcorder 10 of FIG. 1A in a PMP unit camcorder control application 114 installed on the PMP unit 100 of FIG. 1B, according to an embodiment of the present invention. The process 30, which is preferably understood in conjunction with the previous figures especially FIGS. 1A-1C, may be implemented in software (e.g., firmware), hardware or a combination of both.

Prior to detecting a camera unit 150, the process 30 starts by holding an idle state. Once the camera unit 150 is detected at 302, the process 30 activates all of the camcorder control functions in the PMP unit camcorder control application (e.g., module 114) at 304. The detection of the camera unit 150 may be accomplished a number of ways, for example, receiving a reply in response to an inquiry message sent; receiving a message directly from the camera unit camcorder control application 140 when the camera unit 150 is powered on; or other equivalent methods of sensing a newly plugged-in device (e.g., plug-and-play). Next, at 306, the process 30 enables the storage device 106 (i.e., hard disk drive) and the display interface 102 (i.e., the LCD screen) of the PMP unit 100 to be usable by the first modular camcorder 10. This may involve a handshaking protocol to sync up the PMP unit camcorder control application 114 and the camera unit camcorder control application 140. The process 30 moves to a decision 308 to monitor commands entered by a user either through the user controls interface 144 of the camera unit 150 or through the input interface 104 of the PMP unit 100. Once a user command is received at 310, the process 30 performs the corresponding camcorder function at 312. In one example, when a user presses a recording button on the camera unit 150, the first modular camcorder 10 will start record the images captured through the lens into a file located on the storage device 106 of the PMP unit 100. In another, a user may scroll through a menu of choices displayed on the display interface 102 to make a selection such as recording resolution, light condition, etc. After the process 30 finishes the corresponding camcorder functions in response to the user command, the process 30 moves back to 308 waiting for another user command.

The first modular camcorder 10 is configured to function just like a traditional camcorder except the display screen and the storage device are located on a PMP unit. The PMP unit can be exchanged for easy repair, review of recording images/videos, and data exchange. For example, a first user plugs in a first personal PMP unit into a camera unit to record personal images/videos. After the first user has finished image/video recording, a second user can use the same camera unit by coupling with a second PMP unit, while the first user may review the image/video just recorded on the first PMP unit in a standalone mode. Since the more vulnerable components (i.e., display screen and hard disk) are located on the exchangeable PMP unit, the exemplary modular camcorder 10 overcomes the difficult-to-repair problems or drawbacks experienced in traditional or prior art camcorders.

Figure 4:
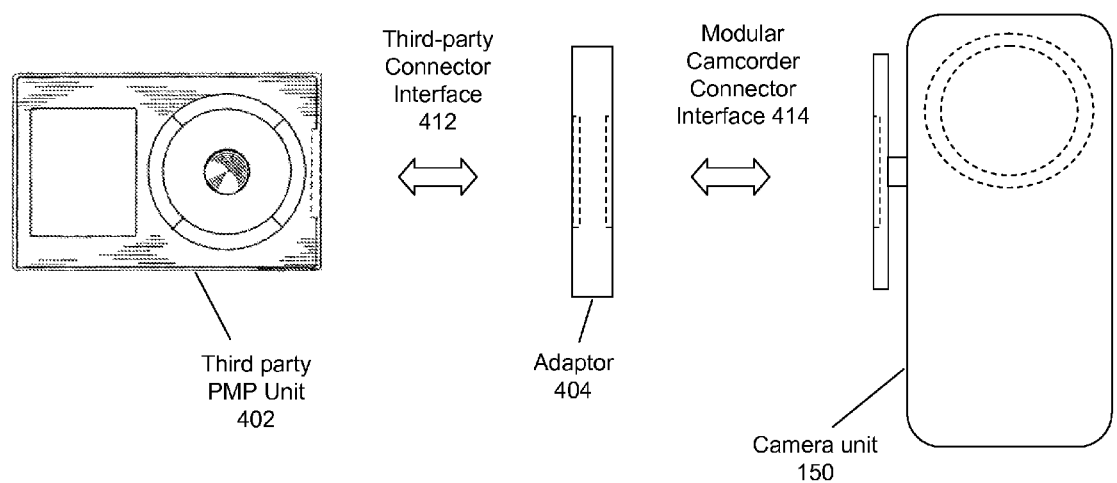
FIG. 4 is a diagram showing a second exemplary modular camcorder including a camera unit, a third-party PMP unit and an optional adapter in accordance with one embodiment of the present invention.
Figure 5:
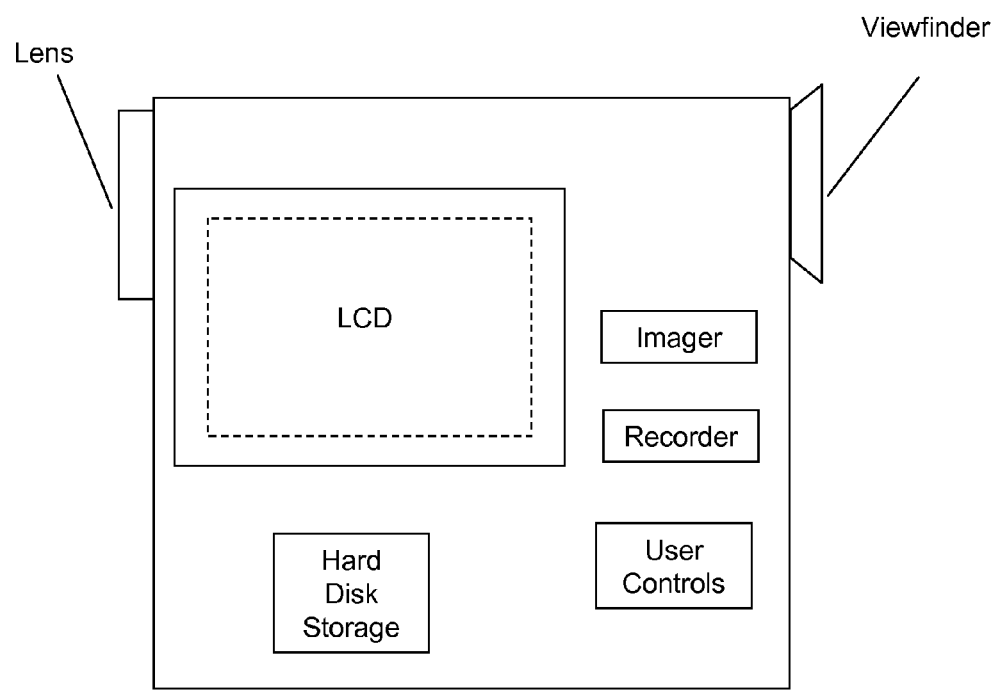
FIG. 5 is a functional diagram showing a prior art camcorder.

FIG. 4 is a diagram showing a second exemplary modular camcorder 40 including a camera unit 150, a third-party PMP unit 402 and an optional adapter 404 in accordance with one embodiment of the present invention. The second modular camcorder 40 and the first modular camcorder 10 are similar. Both camcorders may comprise the same camera unit 150. The second modular camcorder 40 further comprises a third-party PMP unit 402 and an optional adaptor 404.

The third-party PMP unit 402 includes Apple iPod®, Creative Labs ZEN, Sony MP3, and the like. The optional adaptor 404 is configured to facilitate the interface conversion between the camera unit 150 and the third-party PMP unit 402. The camera unit 150 comprises the first connector 121 in accordance with the modular camcorder connector interface 414 (e.g., connector interface 120 of FIG. 2), while the third-party PMP unit 402 comprises a third-party connector with the third-party connector interface 412. When the third-party connector interface 412 and the first connector interface 414 are different (i.e., different pin locations or assignments, physical or logical), the optional adaptor 404 can be inserted to bridge this gap so that the third-party PMP unit 402 can communicate with the camera unit 150.

Although an exemplary embodiment of invention has been disclosed, it will be apparent to those skilled in the art that various changes and modifications may be made to achieve the advantage of the invention. It will be obvious to those skilled in the art that some components may be substituted with another component providing the same function. The appended claims cover the present invention.

What is claimed is:

1. A modular camcorder comprising:
   a camera unit and an optional camera unit camcorder control application installed thereon, said camera unit comprises
   a lens configured to capture one or more optical images of objects,
   a microphone configured to capture audio signals associated with the optical images,
   an imager configured to convert the captured optical images to electrical video signals, an analog-to-digital converter configured to digitize the electrical signals to digital signals, and a processor together with a memory configured to compress the digital signals and to encode the captured audio signals; and a portable multimedia player (PMP) unit and a PMP unit camcorder control application installed thereon, said PMP unit comprises a storage device configured to store the compressed digital signals and the encoded audio signals, a display screen configured to display the captured optical images and to play back the stored digital signals, a memory configured to store the PMP unit camcorder control application, a microprocessor configured to execute instructions from the PMP unit camcorder control application and a user input interface configured to enable a user to traverse a menu of camcorder control commands and select one of the commands, wherein said PMP unit is coupled to said camera unit via a first connector in said camera unit and a second connector in said PMP unit and the menu of camcorder control commands is activated only when said camera unit is detected by the PMP unit camcorder control application.

2. The modular camcorder of claim 1, wherein said camera unit further comprises a user controls interface configured to control functions of said camera unit.

3. The modular camcorder of claim 1, wherein said camera unit further comprises a view finder configured to let a user to see what the optical images being captured by the lens.

4. The modular camcorder of claim 1, wherein the digital signals comprise at least one still or moving image signal.

5. The modular camcorder of claim 1, wherein the first connector and the second connector are matching pair with corresponding pins and receptacles for pins in accordance with a modular camcorder connector interface.

6. The modular camcorder of claim 1, wherein the pins and receptacles for pins comprise Universal Serial Bus pins and power pins.

7. The modular camcorder of claim 6, wherein the pins and receptacles for pins further comprise control pins for said camera unit.

* * * * *